United States Patent [19]

Jorgensen

[11] Patent Number: 5,289,851
[45] Date of Patent: Mar. 1, 1994

[54] PLUG FOR HEAT EXCHANGER TUBES

[75] Inventor: Glenn F. Jorgensen, Ridgewood, N.J.

[73] Assignee: JNT Technical Services Inc., Little Ferry, N.J.

[21] Appl. No.: 44,160

[22] Filed: Apr. 8, 1993

[51] Int. Cl.$^5$ .............................................. F16L 55/12
[52] U.S. Cl. ....................................... 138/89; 165/171; 220/234
[58] Field of Search ........................... 138/89; 220/234; 165/71; 29/523

[56] References Cited

U.S. PATENT DOCUMENTS

| | | | |
|---|---|---|---|
| 4,421,137 | 12/1983 | Nusbaumer et al. | 138/89 |
| 4,436,117 | 3/1984 | Martin | 138/89 |
| 4,646,816 | 3/1987 | Rothstein | 138/89 |
| 4,653,540 | 3/1987 | Epstein . | |
| 4,751,944 | 6/1988 | Sinha et al. | 138/89 |

*Primary Examiner*—James E. Bryant, III

[57] ABSTRACT

A tube plug for sealing the end of a tube is provided, which includes a cylindrical housing member sized for insertion within the end portion of the tube. The housing member has a longitudinal blind bore comprising a smooth portion communicating with a threaded portion. An eccentric locking ring is mounted on the housing member for locking the inserted housing member against rotation relative to the tube. An insert member having a threaded end portion is received within the threaded portion of the bore. An enlarged portion is positioned to be drawn within the smooth portion of the bore in response to rotation of the insert member threaded end portion in the bore threaded portion. A tapered portion is provided between the end portion and the enlarged portion. The tapered portion is formed separately from the remainder of the insert member in the form of a truncated cone with a threaded bore therethrough for receiving the threaded end portion of the insert member. The enlarged portion has a recess therein for receiving a driving tool and for transmitting torque at levels greater than 450 inch pounds. The tapered portion and the enlarged portion are sized to cause the smooth portion of the bore to expand, thereby providing a seal between the housing member and the tube.

20 Claims, 1 Drawing Sheet

5,289,851

PLUG FOR HEAT EXCHANGER TUBES

BACKGROUND OF THE INVENTION

The present invention relates to improvements for a plug used to form a seal for tubes, pipes and similar conduits which transport steam, liquid or gases under pressure.

An earlier version of this type of plug commercially exploited the present Applicant is disclosed in U.S. Pat. No. 4,653,540. The plug disclosed in that patent comprises a hollow housing member which has at one end a relatively large open bore surrounded by a thin wall, and a relatively smaller threaded bore which communicates with the larger bore. An insert member is provided which, in use, is threaded into the smaller bore thereby causing a tapered portion which is formed on the insert member to engage the open end of the large bore causing it to expand and bear against the wall of a heat exchanger tube into which the heat exchanger tube plug has been inserted. During use, the housing member is prevented from rotating relative to the heat exchanger tube by means of an eccentric assembly which is mounted on the end of the housing member. At the other end, the insert member has a cylindrical portion and a centrally disposed, integrally formed nut portion. The nut is proportioned to be grasped by a wrench for screwing the insert member into the housing member. The disclosure also suggests that instead of the projecting nut portion, a hexagonal recess may be formed in the end of the cylindrical portion for insertion of a hex wrench or similar tool. The insert member is specified as being integrally formed. A coil spring 34 surrounds the eccentric ring 36 to provide locking engagement against the inner surface of the heat exchanger tube.

The clutch spring on the eccentric ring was abandoned in the production model of this plug. Instead, a knurled outer surface for the eccentric ring and also short axial grooves on the plug body were added in order to prevent slipping when the eccentric cam actuated.

Also, annular grooves were added to the plug body to increase the sealing potential of the plug. If the plug was installed in a tube that had corrosion, then the raised portion of the serration would cut through any scale and would be stored in the groove thereby enhancing the mechanical contact seal.

Early on during manufacture of the plug defined in U.S. Pat. No. 4,653,540, the plugs had a machined male hex that would accommodate a 11/32 inch socket. This, however, proved unsatisfactory because the sockets split and could not be turned down to a diameter in order to fit in any tube smaller than ½ inch. This would be necessary when the plug is recessed within the end of a tube to be sealed. The next design evolution entailed broaching a ¼ inch female square drive in plugs from 460 inches to 0.610 inches in diameter and a ⅜ inch square drive in all plugs 0.620 inches and larger.

The shortcomings of this female square drive have included that the smallest plug that can be manufactured is 0.460 inches in diameter. The heat exchanger industry has vessels with 158 inches by 12 gauge diameter tubes (0.420 inch nominal i.d.) for which plugs having a 0.460 inch diameter cannot be used. A ¼ inch square drive has a diagonal dimension of 0.354 inches leaving only 0.53 inches of material at the corners of the broach if a 0.460 inch diameter plug is used. This thin amount of material at the corners of the broach results in cracking in the corners and ultimate failures of the plug when installed at a recommended torque value of 400 inch pounds.

Also, commercially available tooling in ¼ inch socket drive extensions can withstand only 425 to 460 inch pounds of torsional force before failure. This has limited the recommendation for installation to a maximum of 400 inch pounds in order to provide a safety factor. In reality, 600 to 650 inch pounds of torque, as discerned from testing, would yield a higher radial expansion force and a better sealing capability by as much as 50%.

It therefore would be an improvement in this art if a tube plug were provided which permitted a higher torque level for installation and such a plug which could be used in smaller diameter sizes.

SUMMARY OF THE INVENTION

The present invention provides an improvement in a tube plug which allows a tube plug to be provided in dimensions down to 0.420 inches, yet which permits installation torque values of up to 700 inch pounds. In this improved plug, the insert member as disclosed in U.S. Pat. No. 4,653,540, has been replaced with a T45 Torx ® socket head screw combined with a separately machined cone having an internal passage threaded to match the threads of the screw.

A T45 Torx ® drive can be torqued to 764 inch pounds before failure which permits a recommended installation value of up to 700 inch pounds to be utilized. By requiring the machining of only the small cone which is threaded onto the socket head screw, substantial machine time is saved.

DETAILED DESCRIPTION OF THE PREFERRED EMBODIMENTS

Figure 1:
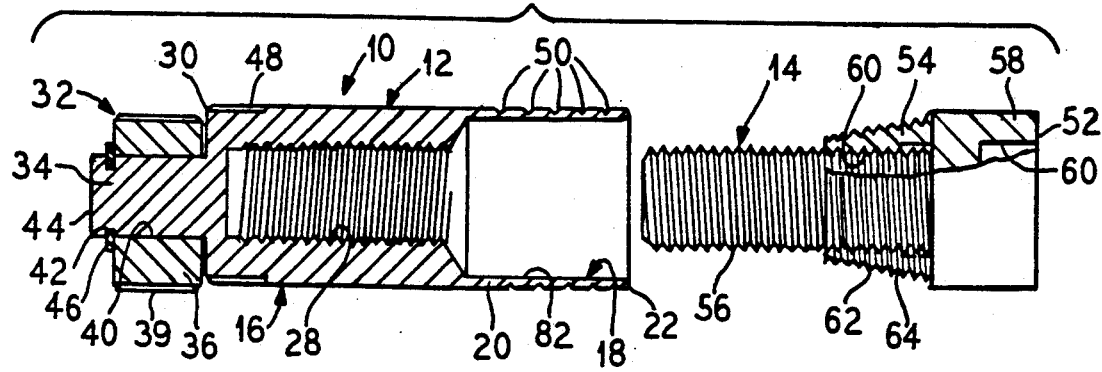
FIG. 1 is an exploded view of a heat exchanger tube plug made in accordance with the present invention, with the plug shown substantially in cross section.
Figure 5:
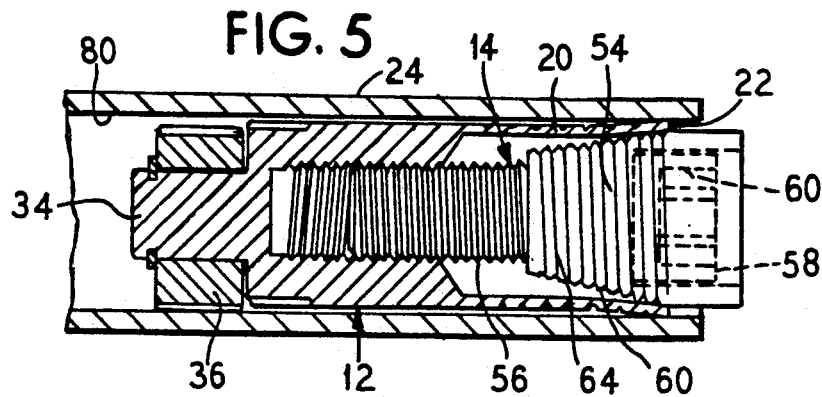
FIG. 5 is a cross-sectional view similar to FIG. 4 with the apparatus shown sealing the end of a boiler tube.

In FIG. 1 a boiler tube plug 10 is shown which is made in accordance with the present invention. The plug 10 comprises a hollow housing member 12 and an insert member 14. The housing member 12 has a cylindrical body 16, the rear portion of which is formed with a large open bore 18. The bore 18 is surrounded by relatively thin wall 20, the end portion 22 of which will expand outwardly to provide a seal for a boiler tube as is shown in FIG. 5, when the insert member 14 is screwed into the housing member 12. The housing member 12 also includes a relatively smaller internally threaded cylindrical bore 28 which communicates with the large bore 18.

Figure 4:
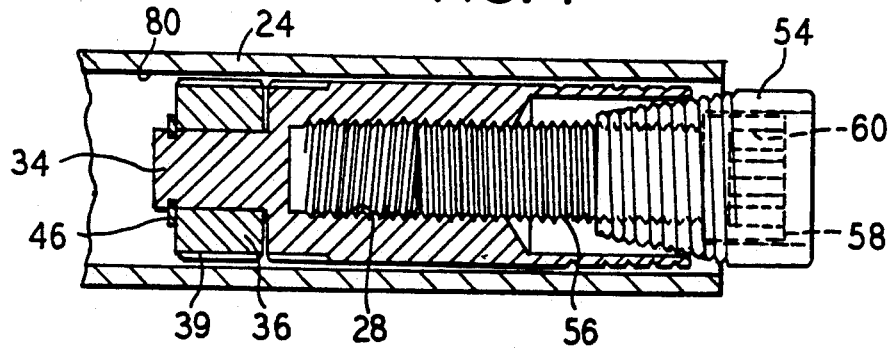
FIG. 4 is a cross-sectional view of the apparatus of FIG. 1 with the apparatus shown assembled and inserted into the end of a boiler tube.

At its front end 30, the housing member 12 is provided with an eccentric assembly 32 which serves to lock the housing member tightly within the boiler tube 24, as is shown in FIGS. 4 and 5, so that the insert member can be screwed into the housing member 12.

Figure 2:
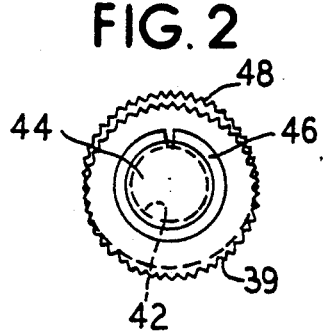
FIG. 2 is a left elevational end view of the apparatus of FIG. 1.
Figure 3:
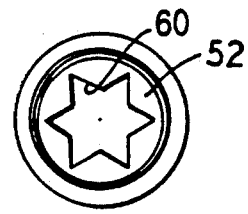
FIG. 3 is an elevated right end view of the apparatus of FIG. 1.

The eccentric assembly 32 comprises a cylindrical post 34 which projects axially from the front end 30 of the housing member 12, a ring member 36 which is mounted eccentrically on the post and is rotatable thereon, as shown in FIG. 2. As is shown in FIGS. 1 and 2, the post 34 is disposed eccentrically relative to a longitudinal axis of the housing member 12.

An outer cylindrical surface 39 of the ring member 36 is serrated or knurled in order to provide enhanced frictional gripping between the ring 36 and the tube 24. The ring member 36 has a bore 40 which fits rotatably over the post 34. The post has a groove 42 near a distal end 44 thereof for receiving a locking snap ring 46. This snap ring retains the ring 36 on the post 34.

The housing member 12 has a series of axial grooves 48 at the end adjacent to the ring member 36 for enhancing frictional gripping of the housing member 12 to the tube 24 to prevent continued rotation of the housing member 12 within the tube. The outer surface of the housing member 12 also includes a plurality of annular grooves 50 adjacent to the open bore 18 of the housing member to enhance the sealing characteristics of the plug as described below.

The insert member 14 is comprised of a headed cap screw 52 and a separate cone or frustoconical member 54. Preferably the screw is a Torx ® socket head screw having a threaded shank 56 and an enlarged head 58 with a driving recess 60 formed in the head. While a Torx ® socket screw comprises a preferred embodiment, other types of recess drive apertures are known which permit high transmission of torque (above 450 inch pounds) while requiring minimal radial dimensioning for the recess.

The cone member 54 has an internal passage 60 which is threaded to mate with the external thread of the shank 56 of screw 52. The cone may either extend up to and abut an undo surface 57 of a head 58 of the screw as shown in FIG. 1, particularly for smaller radius inserts 14, or it may have an outer diameter greater than the diameter of the head 58 such that the cone portion 54 will surround the head as illustrated in FIGS. 4 and 5.

Although the insert could be made as an integral part, since these socket head screws are readily available commercial items, machining of the small cone 54 permits a substantial savings in machine time over integral formation of the insert 14. The threaded shank 56 of the insert member 14 is sized to be received in the threaded smaller bore 28 of the housing member 12.

In use, the assembled insert member 14 is inserted into the housing member 12 and the threaded shank 56 is screwed into the threaded bore 28 until an outer surface 62, having a spiral groove 64 therein, engages the mouth of the large bore 18 and the insert member 14 can no longer be turned by hand. The eccentric ring member 36 is rotated relative to the post 34, by hand, until it is approximately concentric with the body of the housing member 12. In this condition, the plug 10 is sized so that it may be inserted into the end of a heat exchanger tube 24 to the position shown in FIG. 4, although the clearances between the plug and the tube wall is less than the exaggerated showing in FIGS. 4 and 5.

The driving recess 60 is then engaged with an appropriate tool which causes the ring member 36, which engages the sidewalls of the heat exchanger tube with its knurled surface, to turn on the post 34 toward the eccentric position shown in FIG. 2. The ring member 36 thus presses tightly against an inner surface 80 of the heat exchanger tube 24 so that the ring member 36 can no longer turn on the post 34 and the housing member 12 is tightly locked against turning within the heat exchanger tube 24.

When the drive recess 60 is further turned by the tool, the insert member 14 turns within the housing member 12, with the threaded shank 56 screwing further into the small bore 28. At the same time, the cone surface 62 engages an inner surface 82 of the large bore 18 and as the increasing diameter of the cone 54 enters the large bore 18, it deforms the surrounding thin wall 20 of the housing member 12 outwardly, increasing its diameter as shown in FIG. 5. As the diameter of the thin wall 20 increases, the expanded end portion 22 engages the inner surface 80 of the heat exchanger tube 24 and makes an effective seal therewith. The annular grooves 50 increase the sealing potential of the plug. If the tube 24 has any corrosion on its inner surface 80, the raised portions between the annular grooves 50 would cut through any scale and the scale would be retained in the grooves 50, thereby enhancing the mechanical contact seal.

By increasing the torque value permitted to be applied to the insert member 14, the insert member is driven further into the housing 12, increasing the deformation of the tube 24 and increasing the surface area contact between the plug body wall 20 and the tube. This greatly increases the effectiveness of the plug.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A tube plug for sealing the end of a tube, comprising:

a cylindrical housing member sized for insertion within the end portion of said tube,
      said housing member having a longitudinal blind bore comprising a smooth portion communicating with a threaded portion,
   locking means mounted on said housing member for locking said inserted housing member against rotation relative to said tube, and
   an insert member having a threaded end portion received within the threaded portion of said bore, an enlarged portion positioned to be drawn within said smooth portion of said bore in response to rotation of said insert member threaded end portion in said bore threaded portion, and a tapered portion between said threaded end portion and said enlarged portion,
      said enlarged portion having a recess therein for receiving a driving tool and for transmitting torque at levels greater than 450 inch pounds, and
      said tapered portion and said enlarged portion being sized to cause said smooth portion of said bore to expand, thereby providing a seal between said housing member and said tube.

2. A tube plug according to claim 1, wherein said locking means comprises an eccentric ring rotatably mounted on a post projecting axially from an end of said housing member.

3. A tube plug according to claim 2, wherein said ring has a friction enhancing external cylindrical surface.

4. A tube plug according to claim 1, wherein said housing member has a friction enhancing outer surface.

5. A tube plug according to claim 1, wherein said insert member comprises a headed screw member and a separate frustoconical member which is threadingly received on said leaded screw member.

6. A tube plug according to claim 5, wherein said frustoconical member abuts against an underside of said head of said screw.

7. A tube plug according to claim 5, wherein said frustoconical member has an outer diameter at a larger end which is greater than a diameter of said screw head and said screw head is recessed within said frustoconical member.

8. A tube plug according to claim 2, wherein said ring is held on said post by means of a retaining ring received in an annular groove on said post.

9. A tube plug according to claim 1, wherein said lacking member includes a plurality of external annular grooves thereon surrounding said smooth bore portion.

10. A tube plug for sealing the end of a tube, comprising:

a cylindrical housing member sized for insertion within the end portion of said tube,
said housing member having a longitudinal blind bore comprising a smooth portion communicating with a threaded portion, locking means mounted on said housing member for locking said inserted housing member against rotation relative to said tube, and an insert member having a threaded end portion received within the threaded portion of said bore, an enlarged portion positioned to be drawn within said smooth portion of said bore in response to rotation of said insert member threaded end portion in said bore threaded portion, and a tapered portion between said threaded end portion and said enlarged portion, said tapered portion being formed separately from said threaded end portion and said enlarged portion of said insert member in the form of a truncated cone with a threaded bore therethrough for receiving said threaded end portion of said insert member, and said tapered portion and said enlarged portion being sized to cause said smooth portion of said bore to expand, thereby providing a seal between said housing member and said tube.

11. A tube plug according to claim 10, wherein said locking means comprises an eccentric ring rotatably mounted on a post projecting axially from an end of said housing member.

12. A tube plug according to claim 11, wherein said ring has a friction enhancing external cylindrical surface.

13. A tube plug according to claim 10, wherein said housing member has a friction enhancing outer surface.

14. A tube plug according to claim 10, wherein said insert member comprises a headed screw member and said separate truncated cone abuts against a head of said headed screw member.

15. A tube plug according to claim 14, wherein said truncated cone abuts and terminates against an underside of said head of said screw member.

16. A tube plug according to claim 14, wherein said truncated cone has an outer diameter at a larger end which is greater than a diameter of said screw head and said screw head is recessed within said frustoconical member.

17. A tube plug according to claim 11, wherein said ring is held on said post by means of a retaining ring received in an annular groove on said post.

18. A tube plug according to claim 11, wherein said body includes a plurality of annular grooves thereon surrounding said smooth bore portion.

19. A tube plug according to claim 10, wherein said enlarged portion has a recess therein for receiving a driving tool and for transmitting torque at levels greater than 450 inch pounds.

20. A tube plug for sealing an end of a tube comprising:

a body portion sized to be received within said tube with a minimum of clearance;
said body portion having a friction enhancing outer surface and a central bore therein, with a portion of said bore having a smooth inner surface and a smaller radiused portion having an internal thread;

locking means comprising an eccentric ring rotatably mounted on a post projecting axially from an end of said body portion to prevent said body portion from rotating within said tube, said ring having a friction enhancing external cylindrical surface; and an insert member comprising a headed screw having a threaded portion threadingly received within said threaded bore portion of said body portion and a separately formed tapered portion for engaging with said smooth bore portion of said body portion;

said separately formed tapered portion comprising a frustoconical member with a threaded bore therethrough for engaging with said threaded portion of said insert member;

said insert member having a driving recess in an end thereof opposite said threaded portion for receiving a driving tool and for transmitting torque at a level above 450 inch pounds; and said tapered portion and said enlarged portion being sized to cause said smooth portion of said bore to expand upon threaded insertion of said insert into said body portion, thereby providing a seal between said body portion and said tube.

* * * * *

UNITED STATES PATENT AND TRADEMARK OFFICE
CERTIFICATE OF CORRECTION

PATENT NO. : 5,289,851
DATED : March 1, 1994
INVENTOR(S) : "PLUG FOR HEAT EXCHANGER TUBES"

It is certified that error appears in the above-indentified patent and that said Letters Patent is hereby corrected as shown below:

Column 1, line 57 "460" should read --0.460--; and
    in line 62 "158" should read --5/8--.

CLAIMS:

Claim 5, line 8 "leaded" should be --headed--; and

Claim 9, line 21 "lacking" should be --housing--.

Signed and Sealed this

Ninth Day of April, 1996

Attest:

BRUCE LEHMAN

Attesting Officer    Commissioner of Patents and Trademarks